March 12, 1963
G. R. WALKER ETAL
3,081,099
COLLAR FOR HOLDING AN ANNULAR BEARING OR SEALING
SURFACE ROTATIVELY FAST WITH A SHAFT
Filed Sept. 14, 1961
2 Sheets-Sheet 1
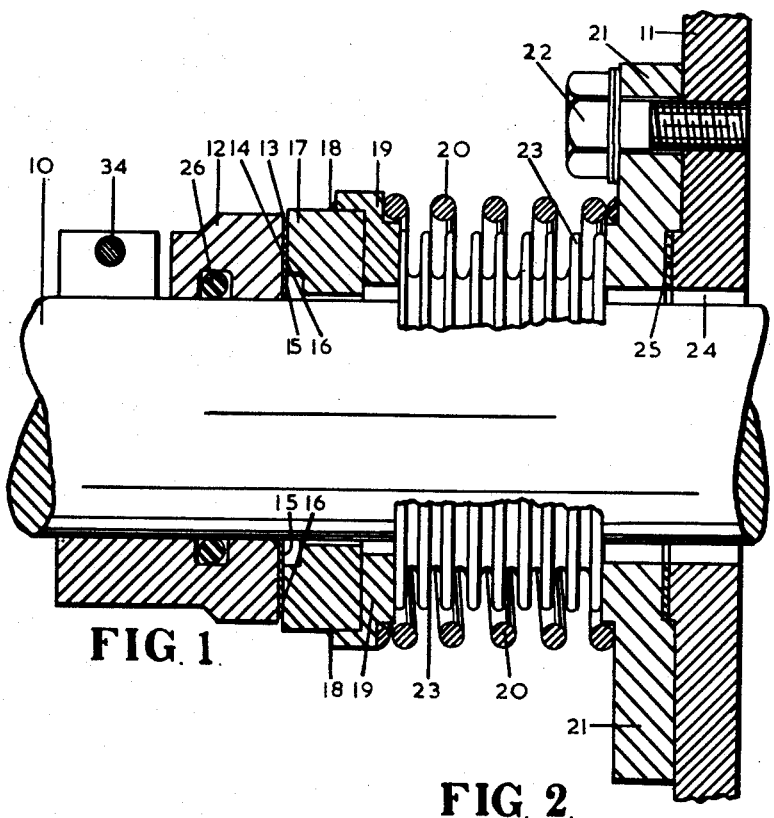
FIG. 1.
FIG. 2.
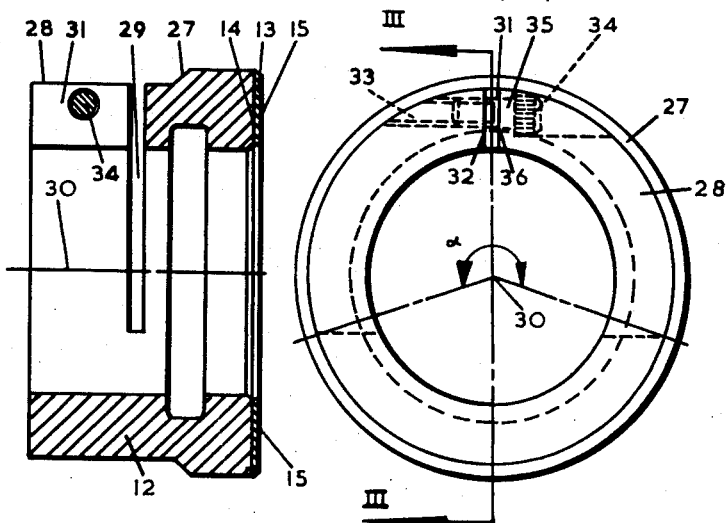
FIG. 3.

United States Patent Office 3,081,099
Patented Mar. 12, 1963

3,081,099
COLLAR FOR HOLDING AN ANNULAR BEARING OR SEALING SURFACE ROTATIVELY FAST WITH A SHAFT
Gordon R. Walker and Albert H. Deacon, Leamington Spa, England, assignors to Filton Limited, Leamington Spa, England
Filed Sept. 14, 1961, Ser. No. 138,103
Claims priority, application Great Britain Nov. 9, 1960
13 Claims. (Cl. 277—88)

The invention relates to improvements in and relating to a collar for holding an annular bearing or sealing surface rotatively fast with a shaft.

An object of the invention is to enable an annular bearing or sealing surface, which has been accurately prepared, to be held rotatively fast with a shaft, by means of a collar, in such a way that the risk of distortion of the surface will be reduced to a minimum.

According to the invention a collar, for attachment to a shaft, is formed in two axially spaced portions, one portion carrying an annular bearing or sealing surface which in use is arranged to engage a similar surface on means with which the shaft is relatively rotatable, and the other portion being provided at its periphery with clamping means, for holding it rotatively fast with the shaft, the two axially spaced portions being rigidly joined together at a region substantially diametrically opposite the clamping means.

Preferably the said other portion of the collar is formed circumferentially discontinuous by a substantially axially extending slot, the clamping means being arranged to close the two sides of the slot together to cause the said other portion to grip the shaft.

The clamping means may be a bolt arranged substantially tangentially of the said other portion, the bolt extending freely through a boss on one side of the slot and threadedly engaging the other side of the slot.

The two portions of the collar may be formed integrally with each other and axially spaced apart by an arcuate groove extending around the collar between the two portions in the region of the clamping means and subtending an angle greater than 180° at the longitudinal axis of the collar.

The invention also includes the combination of a shaft carrying a collar according to any one of the immediately preceding four paragraphs and means providing the said similar surface, the shaft and the said means being relatively rotatable.

One embodiment of the invention, as particularly applied to a gland for sealing a rotatable shaft where it passes through the casing of a liquid oxygen pump, is described by example with reference to the drawings accompanying this specification, in which:

FIGURE 1 is a part axial section of the gland, and an associated collar according to the invention;

FIGURE 2 is an end view of the collar from the left of FIGURE 1;

FIGURE 3 is a section on the line III—III in FIGURE 2;

Figure 4:
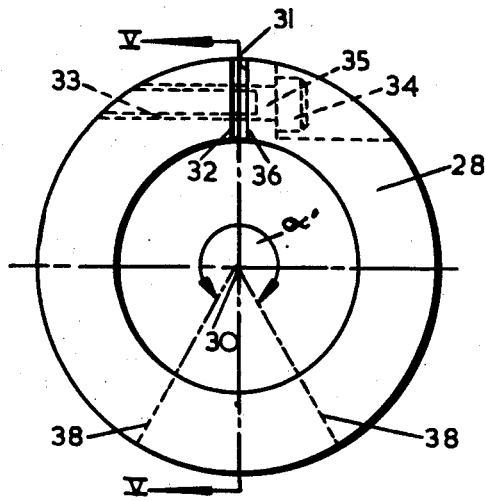
FIGURE 4 is a view similar to FIGURE 2; but showing a modification of the collar.

Referring to FIGURE 1, the said shaft 10 is arranged to be rotated by a prime mover (not shown) to drive a liquid oxygen pump (not shown), housed inside a casing 11. The said collar 12 is held rotatively fast with the shaft 10 in a manner which will be described later. The collar is made of stainless steel and has a layer of chromium 13 deposited on its end face 14. An optically flat bearing and sealing surface 15 is formed on the chromium layer 13 and abuts a corresponding bearing and sealing surface 16 formed on an annular member 17. The latter is welded at 18 to a spring retaining cap 19 and is urged towards the collar 12 by a compression coil spring 20 reacting between the cap 19 and a flange 21, held against the casing 11, by bolts 22. The retaining cap 19 is sealingly attached to the flange 21 by a bellows 23, coaxial with the spring 20. Thus the cap 19 can move axially; but cannot rotate. The surface 16 is urged into contact with the surface 15 by the spring 20.

Liquid oxygen, in communication with the clearance 24 between the shaft 10 and casing 11, is virtually prevented from escaping as follows: seal 25 prevents leakage between the flange 21 and the casing 11; the bellows 23 prevents leakage between the cap 19 and the flange 21; the weld 18 prevents leakage between the member 17 and the cap 19; a sealing ring 26 located in a groove in the collar 12 and engaging the shaft 10 prevents leakage between the shaft 10 and the collar 12; and the relatively rotatable bearing and sealing surfaces 15 and 16 virtually prevent radial leakage between the collar 12 and the member 17, as the leakage of liquid oxygen between the surfaces 15 and 16 is very small indeed, provided that the said surfaces are optically flat and are exactly true to each other.

It is extremely important that substantially no distortion of the surface 15 should occur as even a very small amount of distortion, which could only be detected by optical interference inspection, could result in an undesirably large leakage of liquid oxygen between the surfaces 15 and 16. Known methods of clamping the collar 12 to the shaft 10 could cause distortion of the surface 15; but the present invention enables the collar 12 to be mounted on the shaft 10 with substantially not distortion of the surface 15. With particular reference to FIGURES 2 and 3, it will be seen that the collar 12 is divided into two axially spaced portions 27 and 28 by an arcuate groove 29 which subtends an angle $\alpha$, greater than 180°, at the longitudinal axis 30 of the collar. The portion 27 carries the bearing and sealing surface 15. An axially extending slot 31 is provided in the portion 28, thereby making that portion circumferentially discontinuous at a position substantially diametrically opposite the unslotted land of the collar 12, between the portions 27 and 28. The side wall 32 of the slot 31 is threaded at 33 for engagement by a socket type bolt 34, which extends through a boss 35 in the opposite side wall 36 of the slot. By tightening the bolt 34, the two side walls 32 and 36 of the slot 31 are urged towards each other, thereby causing the portion 28 to grip the shaft 10; but with substantially no resulting distortion of the portion 27.

Figure 5:
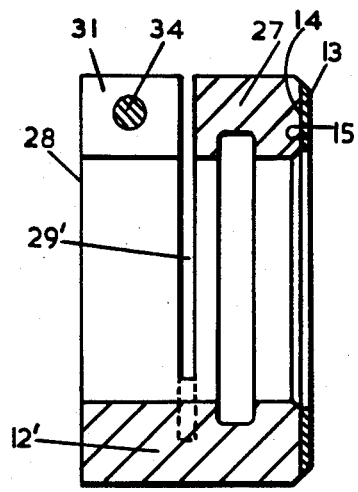
FIGURE 5 is a section on the line V—V in FIGURE 4.

Referring to FIGURES 4 and 5, it will be seen that in the modified collar 12', the groove 29' subtends a greater angle $\alpha'$ than does the groove 29 in the collar 12. A suitable value for the angle $\alpha'$ is 285°. Also the faces 38 at each circumferential end of the groove 29' are radial. These differences have the effect of reducing the volume of metal in the land which connects the two portions 27, 28 of the collar and thereby reduces still further the possibility of distortion of the face 15. All other parts of the collar 12' are similar to corresponding parts of the collar 12 and have been indicated by like reference numerals.

Although the two portions 27 and 28 in the collars 12 and 12' are formed integrally with each other, the portions could be made separately and then rigidly connected together over a short arc substantially diametrically opposite the bolt 34.

At high speeds, e.g., of the order of 2,850 r.p.m. or more, it may be necessary to correct out-of-balance centrifugal forces arising from the provision of the groove 29 or 29' and the bolt 34. The rotational balancing may be provided by applying additional weights to the collar or to the shaft or by making the bore of the collar slightly eccentric to its periphery.

In the gland shown in FIGURE 1, the spring 20 and the bellows 23 are coaxial; but instead of the single spring 20, a plurality of smaller diameter springs may be arranged with their longitudinal axes spaced apart in a ring coaxial with the bellows 23. The said smaller diameter springs may be carried on studs, extending from the flange 21 and freely located in the cap 19 at the ends of the studs remote from the flange 21. The studs therefore act as guides for the cap 19 and allow it to move axially towards and away from the flange 21.

What we claim as our invention and desire to secure by Letters Patent of the United States is:

1. A collar for attachment to a shaft, the collar being formed in two axially spaced portions, one portion carrying an annular bearing and sealing surface, which is arranged to engage a similar surface on means with which the shaft is relatively rotatable, and the other portion being provided at its periphery with clamping means, engageable with the shaft, said two axially spaced portions being rigidly joined together at a region substantially diametrically opposite said clamping means.

2. A collar as claimed in claim 1 in which said other portion of the collar is formed circumferentially discontinuous by a substantially axially extending slot, said clamping means being operative to close the two sides of the slot together to cause said other portion to grip the shaft.

3. A collar as claimed in claim 2 in which said clamping means comprises a bolt arranged substantially tangentially of said other portion and a boss formed on one side of said slot, said bolt extending freely through said boss and threadedly engaging the other side of said slot.

4. A collar as claimed in claim 1 in which said two portions of the collar are formed integrally with each other and are axially spaced apart by an arcuate groove extending around the collar between said two portions in the region of said clamping means and subtending an angle greater than 180° at the longitudinal axis of the collar.

5. A collar as claimed in claim 1 in which said other portion of the collar is formed circumferentially discontinuous by a substantially axially extending slot, said clamping means being operative to close the two sides of the slot together to cause said other portion to grip the shaft and in which said two portions of the collar are formed integrally with each other and are axially spaced apart by an arcuate groove extending around the collar between said two portions in the region of said clamping means and subtending an angle greater than 180° at the longitudinal axis of the collar.

6. A collar as claimed in claim 5 in which said bearing and sealing surface is formed on the end face of the said one portion remote from the said other portion.

7. A collar as claimed in claim 6 in which said bearing and sealing surface is formed on a layer of chromium deposited on the said one portion.

8. The combination of a shaft, a collar mounted on said shaft, and means engageable with said collar and relatively rotatable with respect to said shaft; said collar being formed in two axially spaced portions, one portion carrying an annular bearing and sealing surface, which is arranged to engage a similar surface on said relatively rotatable means, and the other portion being provided at its periphery with clamping means, engaging said shaft, said two axially spaced portions being rigidly joined together at a region substantially diametrically opposite said clamping means.

9. The combination as claimed in claim 8 in which said other portion of the collar is formed circumferentially discontinuous by a substantially axially extending slot, said clamping means being operative to close the two sides of the slot together to cause said other portion to grip the shaft.

10. The combination as claimed in claim 8 in which said two portions of the collar are formed integrally with each other and are axially spaced apart by an arcuate groove extending around the collar between said two portions in the region of said clamping means and subtending an angle greater than 180° at the longitudinal axis of the collar.

11. The combination as claimed in claim 8 in which said other portion of the collar is formed circumferentially discontinuous by a substantially axially extending slot, said clamping means being operative to close the two sides of the slot together to cause said other portion to grip the shaft, and in which said two portions of the collar are formed integrally with each other and are axially spaced apart by an arcuate groove extending around the collar between said two portions in the region of said clamping means and subtending an angle greater than 180° at the longitudinal axis of the collar.

12. The combination as claimed in claim 8 in which said relatively rotatable means comprises a gland arranged coaxially around the shaft.

13. The combination as claimed in claim 12 in which the gland comprises an axially fixed flange, an axially movable cap carrying said similar surface, a bellows, sealingly connecting said flange and the cap and arranged coaxially around the shaft, and spring means acting to bias the cap axially towards the collar and axially away from said flange.

No references cited.